United States Patent [19]

Gilliland et al.

[11] 4,397,716
[45] Aug. 9, 1983

[54] VARIABLE ANODIC THERMAL CONTROL COATING

[75] Inventors: Charles S. Gilliland, Poquoson; Roy J. Duckett, Yorktown, both of Va.

[73] Assignee: The United States of America as represented by the Administrator of the National Aeronautics and Space Administration, Washington, D.C.

[21] Appl. No.: 367,134

[22] Filed: Apr. 9, 1982

[51] Int. Cl.³ .............................................. C25D 5/44
[52] U.S. Cl. ................................. 204/33; 204/35 N; 126/901
[58] Field of Search .................. 204/33, 58, 35 N, 42; 126/901

[56] References Cited

U.S. PATENT DOCUMENTS

| 1,771,910 | 7/1930 | Bengough et al. | 204/33 |
| 2,755,239 | 7/1956 | Glauser et al. | 204/35 |
| 2,812,295 | 11/1957 | Patrick | 204/18 |
| 2,847,371 | 8/1958 | Topelian | 204/33 |
| 3,099,610 | 7/1963 | Cybriwsky et al. | 204/33 |
| 3,834,998 | 9/1974 | Watanabe et al. | 204/33 |
| 3,920,413 | 11/1975 | Lowery | 204/33 X |
| 4,097,311 | 6/1978 | Ishibashi et al. | 126/901 X |
| 4,127,451 | 11/1978 | Marceau et al. | 204/58 X |

FOREIGN PATENT DOCUMENTS 54-48344  4/1979  Japan ................................ 126/901

*Primary Examiner*—G. L. Kaplan
*Assistant Examiner*—Nam X. Nguyen
*Attorney, Agent, or Firm*—Howard J. Osborn; John R. Manning; Wallace J. Nelson

[57] ABSTRACT

A process for providing a thermal control solar stable surface coating for aluminum surfaces adapted to be exposed to solar radiation wherein selected values within the range of 0.10 to 0.72 thermal emittance ($\epsilon_T$) and 0.2 to 0.4 solar absorptance ($\alpha_s$) are reproducibly obtained by anodizing the surface area in a chromic acid solution for a selected period of time. The rate, voltage and time, along with the parameters of initial $\epsilon_T$ and $\alpha_s$, temperature of the chromic acid solution, acid concentration of the solution and the material anodized determines the final values of $\epsilon_T$ and $\alpha_s$.

9 Claims, 5 Drawing Figures

VARIABLE ANODIC THERMAL CONTROL COATING

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a process for providing a variable anodic thermal control coating to aluminum surfaces for use as the external surface area of space vehicles to passively control the temperature of the vehicle when exposed to a spatial environment.

The most significant parameter that can be varied to control the temperature of satellites and space vehicles is the ratio of the solar absorptance to the low temperature emittance ($\alpha_s/\epsilon_T$) of the external vehicle surface area. The expression $\alpha_s/\epsilon_T$ is the ratio of the absorptivity of the face of a plate to solar radiation ($\alpha_s$) to the emissivity of the face of the plate to thermal radiation ($\epsilon_T$). Since these quantities are dependent only on the unit surface of an object, the temperature of the object can be adjusted to the desired value by selecting a coating for the object's face that has the requisite value of $\alpha_s/\epsilon_T$. This is the routine procedure used in the design of spacecraft.

Previous passive methods of controlling the surface temperature of spacecraft have included surface oxidation, vapor deposition of thin metallic films, conversion coatings, dielectric films, and partially coating the surface area of the spacecraft with paint to attain the desired effective thermal radiation characteristics. The disadvantages of these prior art methods include the numerous problems included in maintaining the required delicate environment for adequate application thereof and none had the capability of changing different variables in the process to select the desired values for thermal emittance and solar absorptance. The disadvantages of paints is that most of those presently available do not possess stable thermal radiation characteristics when exposed to the space environment. Further, no known method of paint application has been developed capable of obtaining a wide range of thermal radiation characteristics or for providing a complete coverage of the surface area to minimize thermal gradients.

It is therefore an object of the present invention to provide a coating process for aluminum surfaces that can be controlled to produce the desired thermal emittance and solar absorptance value within the respective ranges of 0.10 to 0.72 and 0.2 to 0.4.

Another object of the present invention is a novel process for applying an anodized coating to an aluminum surface to produce consistent thermal control coating characteristics to the surface.

Another object of the present invention is an anodizing process for coating aluminum surfaces that is sensitive to the parameters of voltage, rate of voltage application, time, temperature, acid concentration, material pretreatment and sealing.

An additional object of the present invention is a novel process for providing a variable anodic thermal control on aluminum that permits selection of the thermal emittance and solar absorptance parameters independent of each other.

According to the present invention the foregoing and additional objects are obtained by a three phase process involving initial material processing, anodizing the material and post material processing. The process described herein is applicable for any aluminum or aluminum alloy in plate, sheet or foil configuration.

The purpose of the initial material processing is to prepare the material for anodizing and to establish an initial value of thermal emittance ($\epsilon_T$) and solar absorptivity ($\alpha_s$). This preparation involves cleaning the aluminum material selected by immersion in a metal cleaning bath such as MIL-M-7752 metal cleaner at 5 Av oz/gal balanced with water and operating at 160° F. to 200° F. (nominal 180° F.) for 5-10 minutes (nominal 8 minutes). The aluminum material is then removed from the cleaning solution, rinsed thoroughly in a water bath at ambient temperature and then immersed in a deoxidizer solution. The deoxidizer solution employed in the present process was a mixture of chromic acid (federal specification O-C-303 Type II at 5 Av oz/gal) and sulfric acid (federal specification O-5-809 at 12 Fl. oz/gal) balanced with water and employed at 150° F. to 180° F. (nominal 170° F.) for 2-5 minutes (nominal 4 minutes). The deoxidized aluminum surface material is again rinsed in a water bath at ambient temperature while physically agitating the aluminum surface to ensure that all particulates are removed from the surface. After drying by filtered forced air, the initial thermal emissivity ($\epsilon_T$) and solar absorptivity ($\alpha_s$) values for the material are established by conventional measuring procedures.

After establishing the initial thermal emission and solar absorptance values, the aluminum surface is anodized by immersing in a chromic acid solution containing $CrO_3$ in the range of 3 to 10 percent by weight balanced with water. A D.C. voltage is applied between the aluminum and the chromic acid solution by a conventional process. Starting at zero volts, the voltage is increased at a predetermined rate (notminal 30 seconds) up to a selected voltage and maintained for a selected period of time. The rate, voltage and time, along with the parameters of initial thermal emittance ($\epsilon_T$) and solar absorptance ($\alpha_s$), the temperature of the chromic acid solution, acid concentration of the solution and the material to be anodized all combine to determine the final value of $\epsilon_T$ and $\alpha_s$.

The aluminum is then removed from the chromic acid bath and rinsed with water to remove the residue chromic acid. Sealing of the coating is then attained by placing the aluminum surface material in a clear water sealing bath at a temperature of 170° F. to 200° F. (nominal 180° F.) for ten minutes. The aluminum is then dried using filtered forced air at ambient temperature and final $\epsilon_T$ and $\alpha_s$ values measured, as before.

Referring now more particularly to the drawings.

Figure 1:
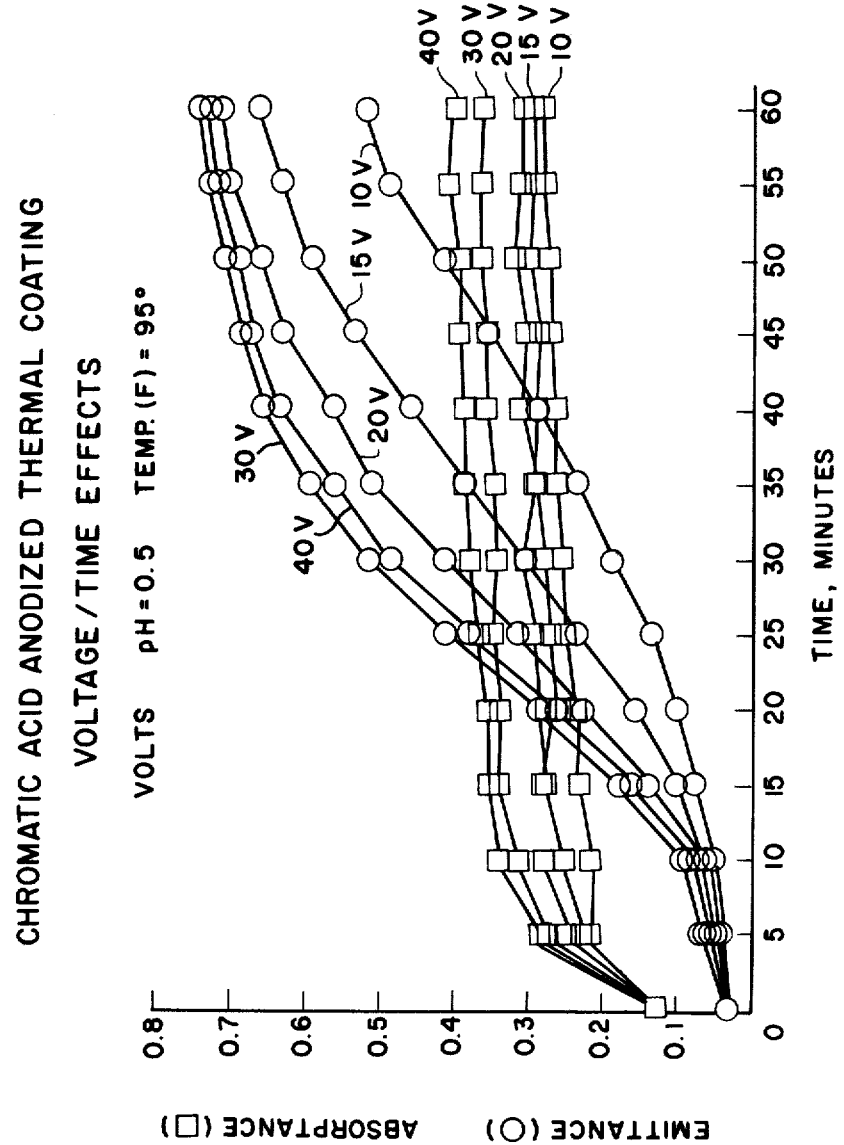
FIG. 1 is a graphical representation of the voltage and time effects on $\epsilon_T$ and $\alpha_s$ values obtained when the chromic acid concentration is maintained at a pH of 0.5, a constant acid bath temperature of 95° F. and different voltages from 10 to 40 volts being applied between the aluminum surface material and the chromic acid solution over a sixty minute time period.
Figure 2:
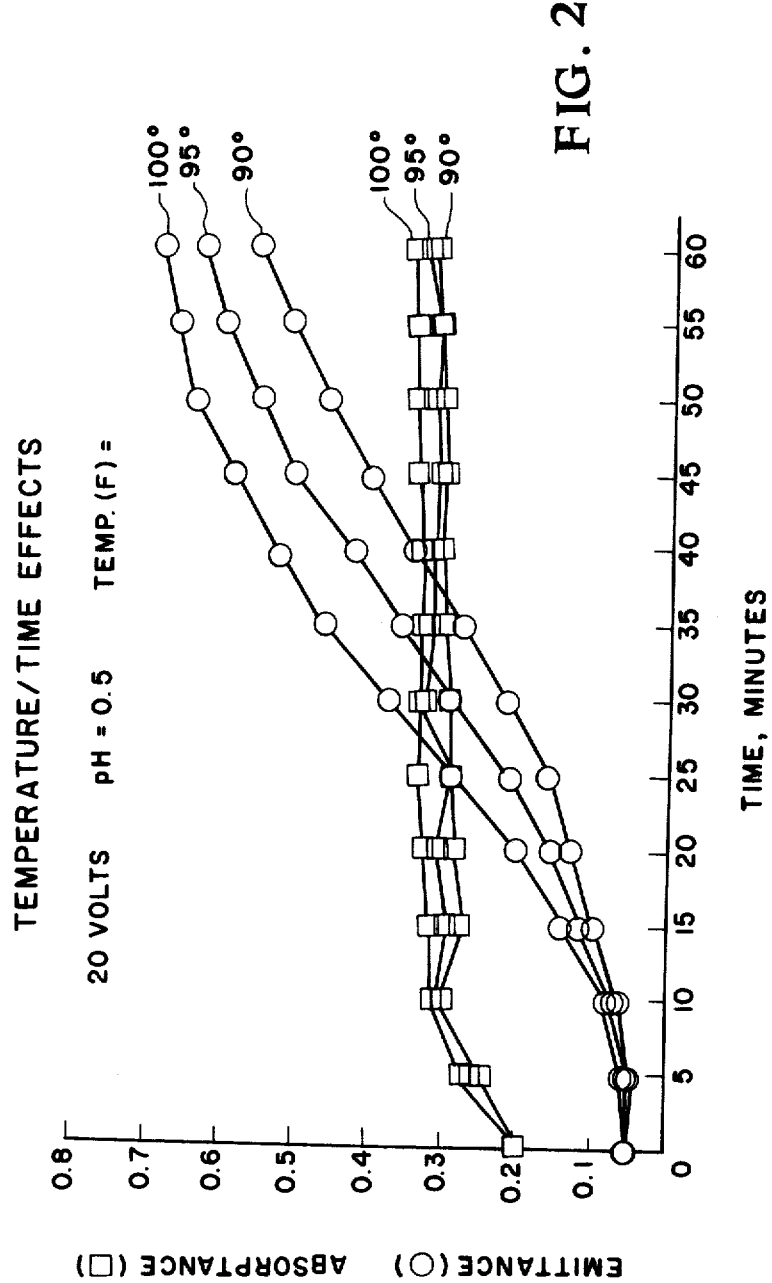
FIG. 2 is a graphical representation of the temperature and time effects on $\epsilon_T$ and $\alpha_s$ values obtained during a sixty minute time period with the pH concentration of the chromic acid bath maintained at 0.5, a constant voltage of 20 volts and for temperatures at 90° F. and 100° F.
Figure 3:
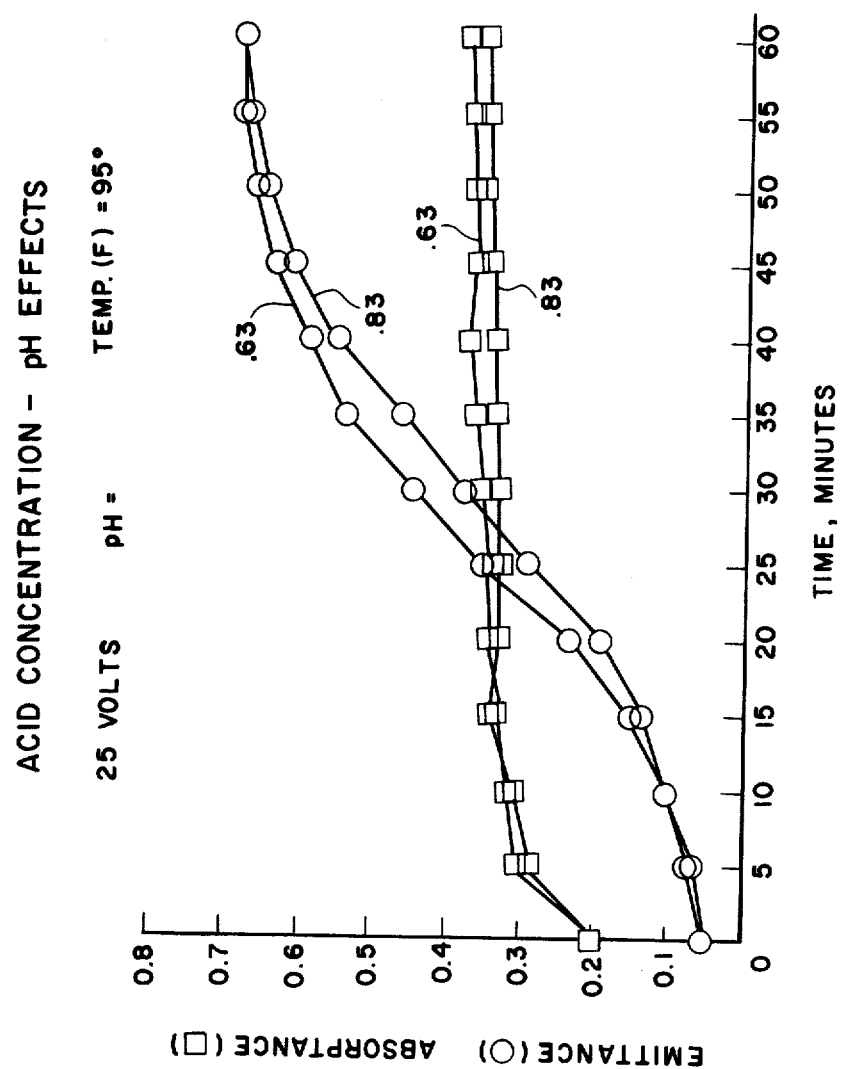

FIG. 3 graphically illustrates acid concentration and time effects on $\epsilon_T$ and $\alpha_s$ values obtained according to the present invention during a sixty minute application of a constant voltage of 25 volts, a constant temperature of 95° F. and with chromic acid bath concentrations of 0.63 and 0.83 pH.

Figure 4:
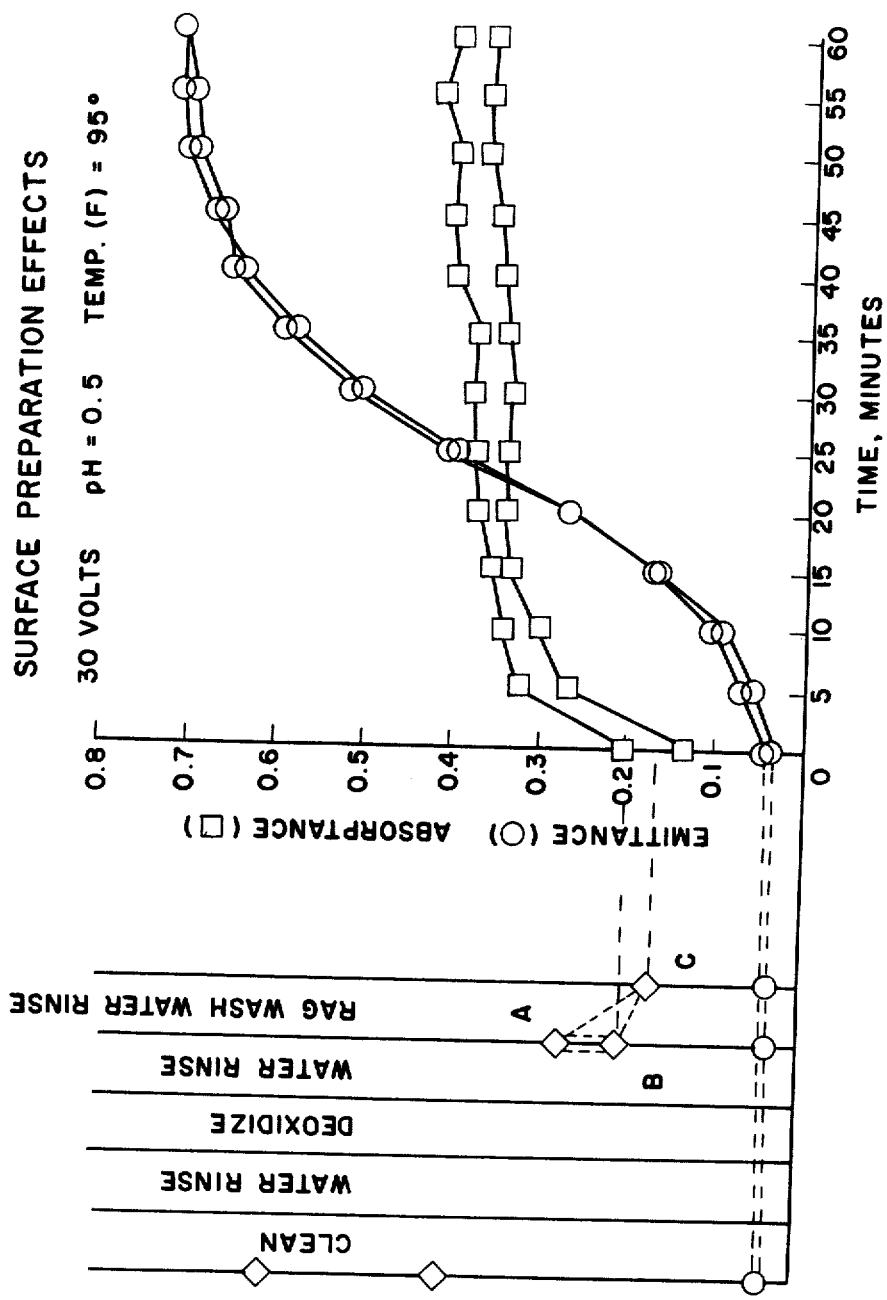

FIG. 4 graphically illustrates surface preparation effects on the initial and final values of $\epsilon_T$ and $\alpha_s$ values obtained during a sixty minute chromic acid treatment on an aluminum surface where the acid bath concentration is 0.5 pH, the bath temperature is maintained at 95° F. and the voltage applied between the aluminum surface and the chromic acid bath is a constant 30 volts.

The aluminum surface material employed in the graphic examples of FIGS. 1-4 is 6061 aluminum and values for 1145 and 2024 aluminum sheet stock with thicknesses as small as 0.001 inch for all three aluminum types giving equivalent reproducible results for the same constant parameters.

Figure 5:
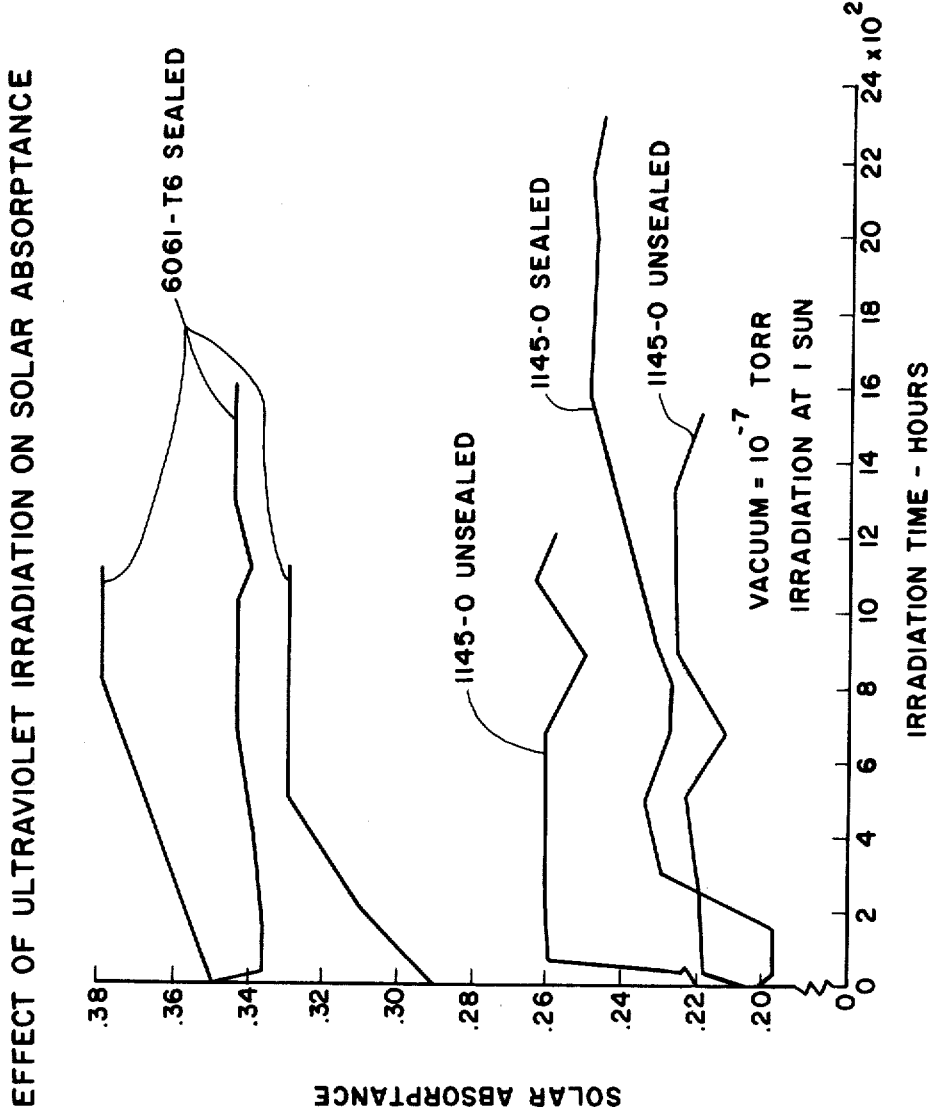

FIG. 5 is a graphical illustration of the effects of ultraviolet irradiation on solar absorptance for the specific aluminum surface material samples designated therein and prepared in accordance with the present invention.

It is thus seen that the present invention provides a process for obtaining selected values for thermal emittance ($\alpha_T$) and solar absorptance ($\alpha_s$) within specified ranges on the same piece of aluminum material. In addition to providing excellent solar stability for the material, i.e., less than 15 percent degradation over a 2000 hour solar exposure (FIG. 5), the reproducibility of results has proved excellent where processing parameters remain constant. Thus, $\epsilon_T$ and $\alpha_s$ values within the ranges specified are readily obtainable by selecting the parameters for these values illustrated in the graphic representations of FIGS. 1-4. An important feature of the present invention is to obtain consistent reproducible initial values for $\alpha_s$. This is shown more clearly in FIG. 4 wherein after deoxidizing and prior to the physical agitation (rag wash) to ensure removal of all particulates, the values obtained for $\alpha_s$ varied between points A and B, but after the rag wash step, consistent values as designated by point C were obtained.

Although the invention has been described relative to a specific process on specific material surfaces and for specific values of $\epsilon_T$ and $\alpha_s$, the invention is not so limited and numerous variations and modifications of the present invention will be readily apparent to those skilled in the art in the light of the above teachings without departing from the spirit or scope of the appended claims.

What is claimed as new and desired to be secured by Letters Patent of the United States is:

1. A method of providing a thermal control coating on an aluminum or aluminum alloy surface with the coating having selected values within the ranges of 0.10 to 0.72 thermal emittance ($\epsilon_T$) and 0.2 to 0.4 solar absorptance ($\alpha_s$) comprising the steps of providing an aluminum or aluminum alloy material having a thickness of at least 0.001 inch and a surface area thereon adapted to be subjected to elevated temperatures;

cleaning the surface area by immersion in a metal cleaning bath at a temperature of 160° F. to 200° F. for five to ten minutes;

removing the surface from the cleaning bath and rinsing in a room temperature water bath;

placing the surface in a deoxidixer solution at a temperature of 150° F. for two to five minutes;

removing the surface from the deoxidizer solution and rinsing in a room temperature water bath with surface agitation to remove all particulates from the surface;

drying the surface by forced filtered air and measuring the initial thermal emittance and solar absorptance at this point;

immersing the dried aluminum surface in a chromic acid solution;

applying a controlled voltage between the surface and the chromic acid solution at a rate and for a period of time required to provide an anodized coating on the surface exhibiting the desired thermal emittance and solar absorptance respective ranges of 0.10 to 0.72 and 0.2 to 0.4.

2. The method of claim 1 including the further steps of removing the anodized surface from the chromic acid bath;

rinsing with water to remove the residual chromic acid;

immersing the surface in a sealing bath consisting of clear water maintained in the temperature range of 170° F. to 200° F. for ten minutes;

removing the surface from the sealing bath and drying with forced filtered air at ambient temperature.

3. The method of claim 1 wherein the aluminum or aluminum alloy surface provided with the thermal control coating is selected from the group consisting of aluminum sheet, aluminum plate and aluminum foils of 6061, 1145 and 2024 aluminum.

4. The method of claim 1 wherein the chromic acid solution contains three to ten percent by weight $CrO_3$ balanced with water.

5. The method of claim 1 wherein the chromic acid solution is maintained in the temperature range of 90° F. to 100° F. during the anodizing step.

6. The method of claim 1 wherein the pH of the chromic acid solution is in the range of 0.5 to 0.83.

7. The method of claim 1 wherein the controlled voltage applied between the surface and the chromic acid solution is in the range of 10 to 40 volts and the time period is between 10 and 60 minutes.

8. The method of claim 1 wherein the chromic acid solution has a pH of 0.5 and is maintained at a temperature of approximately 95° F. during the anodizing step.

9. The method of claim 8 wherein the controlled voltage applied between the aluminum surface and the chromic acid solution is approximately 25 volts and the time period of voltage application is 60 minutes.

* * * * *